(12) United States Patent
Chaudhry et al.

(10) Patent No.: US 8,745,654 B1
(45) Date of Patent: Jun. 3, 2014

(54) METHOD AND SYSTEM FOR MANAGING DIGITAL RIGHTS FOR CONTENT

(75) Inventors: Kapil Chaudhry, Cerritos, CA (US); Jin H. Chung, Fullerton, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 147 days.

(21) Appl. No.: 13/370,170

(22) Filed: Feb. 9, 2012

(51) Int. Cl.
  *H04N 7/16* (2011.01)
  *H04N 7/167* (2011.01)

(52) U.S. Cl.
  USPC ............... 725/25; 725/27; 725/28; 725/29; 725/30; 725/31

(58) Field of Classification Search
  USPC .............................................. 725/25, 27–31
  See application file for complete search history.

(56) References Cited

U.S. PATENT DOCUMENTS

| | | | |
|---|---|---|---|
| 4,322,745 A | 3/1982 | Saeki et al. | |
| 4,694,490 A | 9/1987 | Harvey et al. | |
| 5,301,245 A | 4/1994 | Endoh | |
| 5,421,031 A | 5/1995 | De Bey | |
| 5,442,389 A | 8/1995 | Blahut et al. | |
| 5,506,902 A | 4/1996 | Kubota | |
| 5,544,161 A | 8/1996 | Bigham et al. | |
| 5,701,582 A | 12/1997 | De Bey | |
| 5,734,853 A | 3/1998 | Hendricks et al. | |
| 5,878,141 A | 3/1999 | Daly et al. | |
| 5,917,481 A | 6/1999 | Rzeszewski et al. | |
| 6,115,074 A | 9/2000 | Ozkan et al. | |
| 6,175,362 B1 | 1/2001 | Harms et al. | |
| 6,229,540 B1 | 5/2001 | Tonelli et al. | |
| 6,253,375 B1 | 6/2001 | Gordon et al. | |
| 6,289,314 B1 | 9/2001 | Matsuzaki et al. | |
| 6,289,455 B1 | 9/2001 | Kocher et al. | |
| 6,381,747 B1 | 4/2002 | Wonfor et al. | |
| 6,424,717 B1 | 7/2002 | Pinder et al. | |
| 6,510,519 B2 | 1/2003 | Wasilewski et al. | |
| 6,519,693 B1 | 2/2003 | De Bey | |

(Continued)

FOREIGN PATENT DOCUMENTS

| | | |
|---|---|---|
| EP | 1176826 A2 | 1/2002 |
| EP | 1176827 A2 | 1/2002 |
| WO | 99/18729 A1 | 4/1999 |
| WO | 2007074359 A1 | 7/2007 |

OTHER PUBLICATIONS

International Search Report and Written Opinion dated Jun. 10, 2013 in International Application No. PCT/US2013/025047 filed Feb. 7, 2013 by Kapil Chaudhry et al.
UpnP-hacks; http://www.upnp-hacks.org/igd.html; 2006-2011.

(Continued)

*Primary Examiner* — Nasser Goodarzi
*Assistant Examiner* — Fred Peng

(57) ABSTRACT

A method and system for providing digital rights to a user device is set forth. The user device forms a selection signal from guide data. The user device communicates a digital rights determination signal to a first authentication module in response to selecting. The first authentication module communicates a query signal to a second authentication module to determine whether the user device is authorized to receive content associated with the selection signal. The second authentication module communicates an address of a content delivery module to the user device through the first authentication module when the user device is authorized. A digital rights management server communicates a request for content to a content delivery module using the address of the content delivery module. The content delivery module communicates content to the user device corresponding to the selection signal. The user device displays content on the display associated with the user device.

28 Claims, 4 Drawing Sheets

(56) References Cited

U.S. PATENT DOCUMENTS

| | | |
|---|---|---|
| 6,529,680 B1 | 3/2003 | Broberg |
| 6,543,053 B1 | 4/2003 | Li et al. |
| 6,574,795 B1 | 6/2003 | Carr |
| 6,636,966 B1 | 10/2003 | Lee et al. |
| 6,748,080 B2 | 6/2004 | Russ et al. |
| 6,792,618 B1 | 9/2004 | Bendinelli et al. |
| 6,801,528 B2 | 10/2004 | Nassar |
| 6,816,596 B1 | 11/2004 | Peinado et al. |
| 6,824,051 B2 | 11/2004 | Reddy et al. |
| 6,839,757 B1 | 1/2005 | Romano et al. |
| 6,885,660 B2 | 4/2005 | Inbar et al. |
| 6,889,208 B1 | 5/2005 | Okabe et al. |
| 6,934,963 B1 | 8/2005 | Reynolds et al. |
| 6,961,858 B2 | 11/2005 | Fransdonk |
| 6,983,319 B1 | 1/2006 | Lu et al. |
| 6,993,499 B2 | 1/2006 | Gagnon et al. |
| 6,993,782 B1 | 1/2006 | Newberry et al. |
| 7,003,791 B2 | 2/2006 | Mizutani |
| 7,016,498 B2 | 3/2006 | Peinado et al. |
| 7,027,460 B2 | 4/2006 | Iyer et al. |
| 7,032,236 B1 | 4/2006 | Ozkan et al. |
| 7,035,827 B2 | 4/2006 | Ezaki |
| 7,054,447 B1 | 5/2006 | Price, III |
| 7,069,312 B2 | 6/2006 | Kostic et al. |
| 7,073,073 B1 | 7/2006 | Nonaka et al. |
| 7,137,006 B1 | 11/2006 | Grandcolas et al. |
| 7,191,335 B1 | 3/2007 | Maillard |
| 7,194,757 B1 | 3/2007 | Fish et al. |
| 7,194,759 B1 | 3/2007 | Chess et al. |
| 7,203,311 B1 | 4/2007 | Kahn et al. |
| 7,327,931 B2 | 2/2008 | Frantz |
| 7,356,584 B2 | 4/2008 | Yip |
| 7,370,342 B2 | 5/2008 | Ismail et al. |
| 7,496,540 B2 | 2/2009 | Irwin et al. |
| 7,546,623 B2 | 6/2009 | Ramraz et al. |
| 7,668,838 B2 | 2/2010 | Baio et al. |
| 7,895,341 B2 | 2/2011 | Schlacht et al. |
| 8,001,565 B2 | 8/2011 | Kahn et al. |
| 2001/0037452 A1 | 11/2001 | Go et al. |
| 2001/0047516 A1 | 11/2001 | Swain et al. |
| 2002/0019984 A1 | 2/2002 | Rakib |
| 2002/0026640 A1 | 2/2002 | Graan |
| 2002/0026643 A1 | 2/2002 | Ewen et al. |
| 2002/0051539 A1 | 5/2002 | Okimoto et al. |
| 2002/0054752 A1 | 5/2002 | Wood et al. |
| 2002/0056118 A1 | 5/2002 | Hunter et al. |
| 2002/0067914 A1 | 6/2002 | Schumann et al. |
| 2002/0095679 A1 | 7/2002 | Bonini |
| 2002/0198846 A1 | 12/2002 | Lao |
| 2003/0031184 A1 | 2/2003 | Cunetto et al. |
| 2003/0037006 A1 | 2/2003 | Maruyama et al. |
| 2003/0046702 A1 | 3/2003 | Sasaki |
| 2003/0066884 A1 | 4/2003 | Reddy et al. |
| 2003/0095791 A1 | 5/2003 | Barton et al. |
| 2003/0121047 A1 | 6/2003 | Watson et al. |
| 2003/0163684 A1 | 8/2003 | Fransdonk |
| 2003/0167392 A1 | 9/2003 | Fransdonk |
| 2003/0188316 A1 | 10/2003 | DePrez |
| 2003/0212997 A1 | 11/2003 | Hejna, Jr. |
| 2004/0034771 A1 | 2/2004 | Edgett et al. |
| 2004/0039905 A1 | 2/2004 | Leoutsarakos |
| 2004/0049796 A1 | 3/2004 | Briggs |
| 2004/0078828 A1 | 4/2004 | Parchman et al. |
| 2004/0083487 A1 | 4/2004 | Collens et al. |
| 2004/0117430 A1 | 6/2004 | Bazot et al. |
| 2004/0139480 A1 | 7/2004 | Delpuch et al. |
| 2004/0177369 A1 | 9/2004 | Akins, III |
| 2004/0233897 A1 | 11/2004 | Yamaguchi et al. |
| 2004/0237100 A1 | 11/2004 | Pinder et al. |
| 2004/0250293 A1 | 12/2004 | Ryal et al. |
| 2005/0050333 A1 | 3/2005 | Yeap et al. |
| 2005/0055724 A1 | 3/2005 | Atad et al. |
| 2005/0066353 A1 | 3/2005 | Fransdonk |
| 2005/0086173 A1 | 4/2005 | Kalwit |
| 2005/0086683 A1 | 4/2005 | Meyerson |
| 2005/0102506 A1 | 5/2005 | Pica et al. |
| 2005/0125540 A1 | 6/2005 | Szu et al. |
| 2005/0152287 A1 | 7/2005 | Yokomitsu et al. |
| 2005/0235361 A1 | 10/2005 | Alkove et al. |
| 2005/0262573 A1 | 11/2005 | Bo et al. |
| 2006/0031472 A1 | 2/2006 | Rajavelu et al. |
| 2006/0036847 A1 | 2/2006 | Bush et al. |
| 2006/0037037 A1 | 2/2006 | Miranz |
| 2006/0046744 A1 | 3/2006 | Dublish et al. |
| 2006/0056397 A1 | 3/2006 | Aizu et al. |
| 2006/0117342 A1 | 6/2006 | Park et al. |
| 2006/0120309 A1 | 6/2006 | Bigras et al. |
| 2006/0168663 A1 | 7/2006 | Viljoen et al. |
| 2006/0174127 A1 | 8/2006 | Kalavade et al. |
| 2006/0179489 A1 | 8/2006 | Mas Ribes |
| 2006/0195881 A1 | 8/2006 | Segev et al. |
| 2006/0218620 A1 | 9/2006 | Nadarajah et al. |
| 2006/0242322 A1 | 10/2006 | Williams et al. |
| 2007/0021053 A1 | 1/2007 | Marrah |
| 2007/0100701 A1 | 5/2007 | Boccon-Gibod et al. |
| 2007/0124602 A1 | 5/2007 | Wald et al. |
| 2007/0130286 A1 | 6/2007 | Hopmann et al. |
| 2007/0160142 A1 | 7/2007 | Abrams, Jr. |
| 2007/0160198 A1 | 7/2007 | Orsini et al. |
| 2007/0162748 A1 | 7/2007 | Okayama et al. |
| 2007/0214103 A1 | 9/2007 | Manthoulis |
| 2007/0217434 A1 | 9/2007 | Welbourn |
| 2007/0233879 A1 | 10/2007 | Woods et al. |
| 2007/0240193 A1 | 10/2007 | Sie et al. |
| 2007/0265970 A1 | 11/2007 | Kahn et al. |
| 2007/0266026 A1 | 11/2007 | Aravamudan et al. |
| 2007/0274327 A1 | 11/2007 | Kaarela et al. |
| 2008/0098450 A1 | 4/2008 | Wu et al. |
| 2008/0112405 A1 | 5/2008 | Cholas et al. |
| 2008/0235513 A1 | 9/2008 | Foster et al. |
| 2008/0256615 A1 | 10/2008 | Schlacht et al. |
| 2009/0129301 A1 | 5/2009 | Belimpasakis |
| 2009/0164579 A1 | 6/2009 | Chaudhry |
| 2009/0207905 A1 | 8/2009 | Tomita |
| 2009/0216623 A1 | 8/2009 | Hendricks et al. |
| 2010/0175092 A1 | 7/2010 | Kikinis et al. |
| 2010/0180322 A1 | 7/2010 | Finn et al. |
| 2010/0241748 A1 | 9/2010 | Ansari et al. |

OTHER PUBLICATIONS

Selen, Kristian; "UPnP Security in Internet Gateway Devices"; 2006; retrieved from http://www.tml.tkk.fi/Publications/C/21/Selen_ready.pdf.

Secure Sockets Layer (SSL); 2000; retrieved from http://www.searchsecurity.techtarget.com/definition/Secure-Sockets-Layer-SSL.

Fiedler, Jens; Kupka, Tomas; Magedanz, Thomas; Kleis, Michael; "Reliable VoIP Services Using at Peer-to-Peer Intranet"; Proceedings of the Eighth IEEE International Symposium on Multimedia (ISM 2006).

WANIPConnection: 1 Service Template Version 1.01; for UPnP Version 1.0; Nov. 2001.

Foldoc definition of HTTP; 2010; retrieved from http://www.foldoc.org.

Warrier, Ulnas and Iyer, Prakash; WANDevice:1 Device Template Version 1.01 for UPnP Version 1.0; Nov. 12, 2001; pp. 1-12.

Pennerath, Frederic; Marynissen, Gert; "WANConnectionDevice:1 Device Template Version 1.01"; UPNP Forum; Nov. 12, 2001; XP002521778; retrieved from the Internet: URL:http://www.upnp.org/standardizeddcps/documents/UPnP_IGD_WANDevice%201.0.pdf; Section 2.4.16.

Contributors: Allegro Software Development Corporation, Conexant Systems, Inc., Intel Corporation, Microsoft Corporation, Motorola, Nokia Corporation, Philips Electronics, Pioneer, Sony Electronics; "UPnP Device Architecture 1.0"; UPNP Forum; Jul. 20, 2006; XP002521777; retrieved from the Internet: URL:http://www.upnp-ic.org/resources/UPnP_device_architecture_docs/UPnP-DeviceArchitecture-v1_0-20060720.pdf; p. 3, lines 8-18.

Vogel, Hans; Weyl, Benjamin; Eichler, Stephan; "Federation Solutions for Inter-and Intradomain Security in Next-Generation Mobile

(56) References Cited

OTHER PUBLICATIONS

Services Platforms"; AEU International Journal of Electronics and Communications; Elsevier, Jena, DE; vol. 60, No. 1; Jan. 2, 2006; pp. 13-19; XP025183729; ISSN: 1434-8411 [retrieved on Jan. 2, 2006]; Section 3.

White, Ron; "How Computers Work"; Millennium Edition, 1999; Que Corporation; Indianapolis, Indiana, US; all pages.

Derfler, Frank J., Jr. and Freed, Les; "How Networks Work"; Bestseller Edition, 1996; Ziff-Davis Press; Emeryville, California, US; all pages.

Gralla, Preston; "How the Internet Works"; Millenium Edition, 1999; Que Corporation; Indianapolis, Indiana, US; all pages.

Muller, Nathan J.; "Desktop Encyclopedia of the Internet"; 1999; Artech House, Inc.; Norwood, Massachusetts, US; all pages.

Tsubakiyama, Hideki and Koga, Keiichiro; "Security for Information Data Broadcasting System with Conditional-Access Control"; IEEE; 1993; pp. 164-170.

EBU Project Group B/CA; "Functional Model of a Conditional Access System"; EBU Technical Review; Jun. 10, 1995; pp. 64-77.

Ma, Huang and Shin, Kang G.; "Multicast Video on Demand Services"; ACM SIGCOMM Computer Communications Review; vol. 32, Issue 1; Jan. 2002; pp. 31-43; ACM Press; New York, New York, US.

Tantaoui, Mounir A.; Hua, Kien A.; Sheu, Simon; "Interaction with Broadcast Video"; International Multimedia Conference Proceedings of the 10th ACM International Conference on Multimedia; pp. 29-38; ACM Press; New York, New York, US; 2002 ISBN: 1-58113-620-X.

Griwodz, Carsten; Merkel, Oliver; Dittmann, Jana; Steinmetz, Ralf; "Protecting VoD the Easier Way"; International Multimedia Conference Proceedings of the 6th ACM International Conference on Multimedia; pp. 21-28; ACM Press; New York, New York, US; 2002 ISBN: 0-201-30990-4.

Anonymous; "PKCS #1 v2.1: RSA/Cryptography Standard"; Jun. 14, 2002; RSA Laboratories; 61 pages.

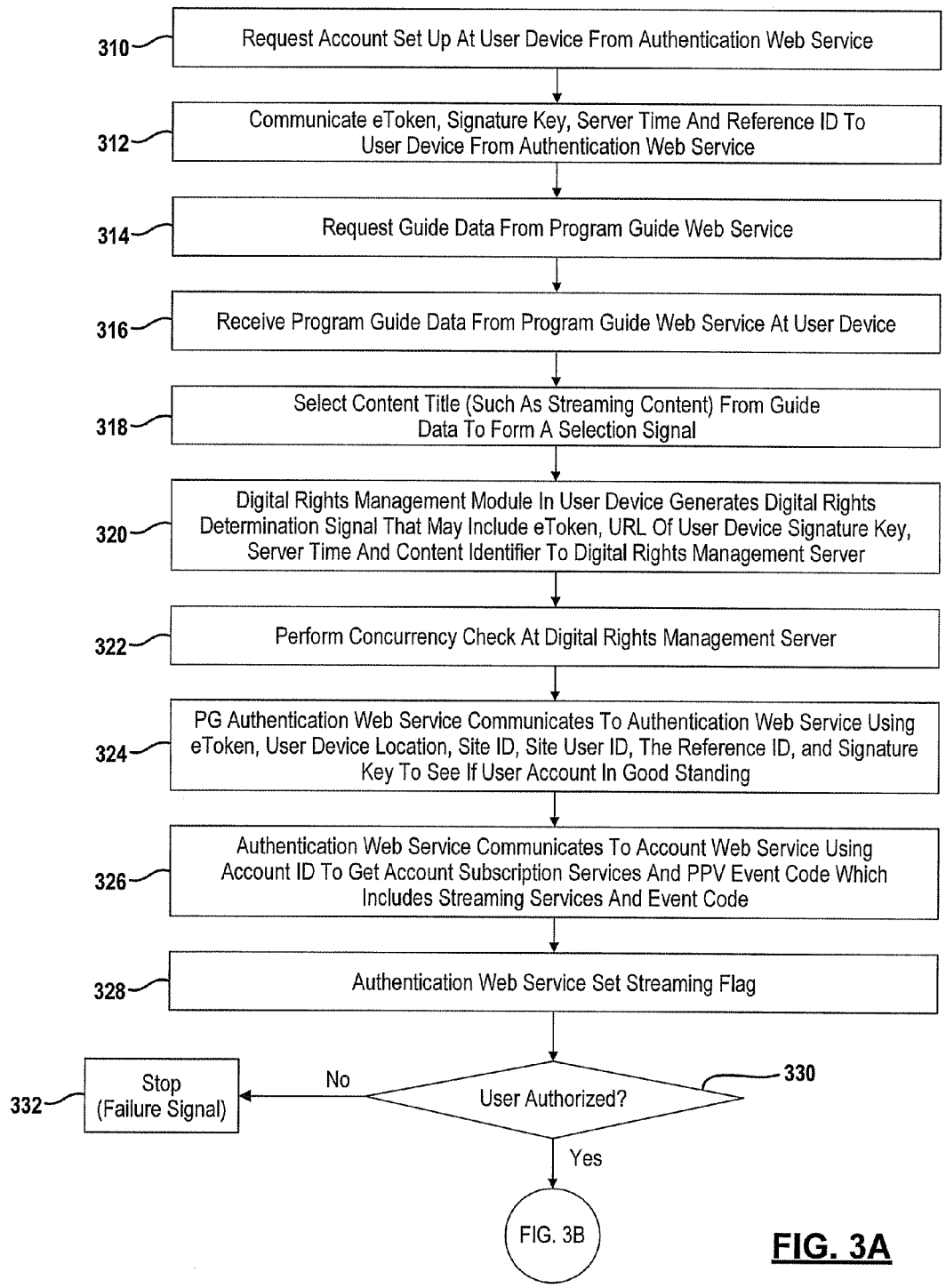

METHOD AND SYSTEM FOR MANAGING DIGITAL RIGHTS FOR CONTENT

TECHNICAL FIELD

The present disclosure relates generally to communication systems, and more particularly, to a method and system for managing digital rights for content provided to a user device.

BACKGROUND

The statements in this section merely provide background information related to the present disclosure and may not constitute prior art.

Communication systems such as pay or subscription communication systems include a primary service provider and a user receiver device such as a set top box or integrated receiver decoder. The user device is typically provided with authorization to communicate with the primary service provider and receive services therefrom. One example of such a system is a satellite television system such as DIRECTV®. Broadcast television channels and other internal programs are provided by the primary service provider.

A set top box is typically a fixed user device. Content providers are also increasing ways to provide content to mobile user devices. In either mobile or fixed devices it is important to provide content to authorized users. For a fixed device conditional access modules are provided. Conditional access modules are typically not provided for a mobile device such a cellular phone or other portable computing device. Digital rights management must be maintained at the mobile device to comply with various contractual obligations relative to the content source and to prevent unauthorized use of the content.

Typically digital rights are maintained by pushing the rights to a user device. This method can burden a system unnecessarily since right management signals may not be required in every instance for any piece of content. That is, some devices may have rights communicated thereto before a determination is made whether rights are required. This may cause unnecessary use of system resources.

SUMMARY

The present disclosure provides a system and method for digital rights management.

In one aspect of the disclosure, a method includes receiving guide data at a user device, displaying the guide data on a display, selecting content from the guide data and forming a selection signal, communicating a digital rights determination signal to a first authentication module, communicating to a query signal from the first authentication module to a second authentication module to determine whether the user device is authorized to receive content associated with the selection signal, when the user device is authorized, communicating an address of a content delivery module from the second authentication module to user device through the first authentication module, communicating a request for content to a content delivery module using the address of the content delivery module, communicating content to the user device, and displaying content at the user device.

In a further aspect of the disclosure, a system for providing digital rights to a user device is set forth. The user device receives guide data and displays the guide data on a display associated therewith. The user device forms a selection signal from the guide data. A first authentication module is in communication with the user device. The user device comprises a digital rights management module that communicates a digital rights determination signal to a first authentication module. The first authentication module communicates a query signal to a second authentication module to determine whether the user device is authorized to receive content associated with the selection signal. The second authentication module communicates an address of a content delivery module to the user device through the first authentication module when the user device is authorized. The digital rights management server communicates a request for content to a content delivery module using the address of the content delivery module. The content delivery module communicates content to the user device. The user device displays content at the user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 3A and 3B show a flowchart of a method for managing digital rights for content.

DETAILED DESCRIPTION

Figure 1:
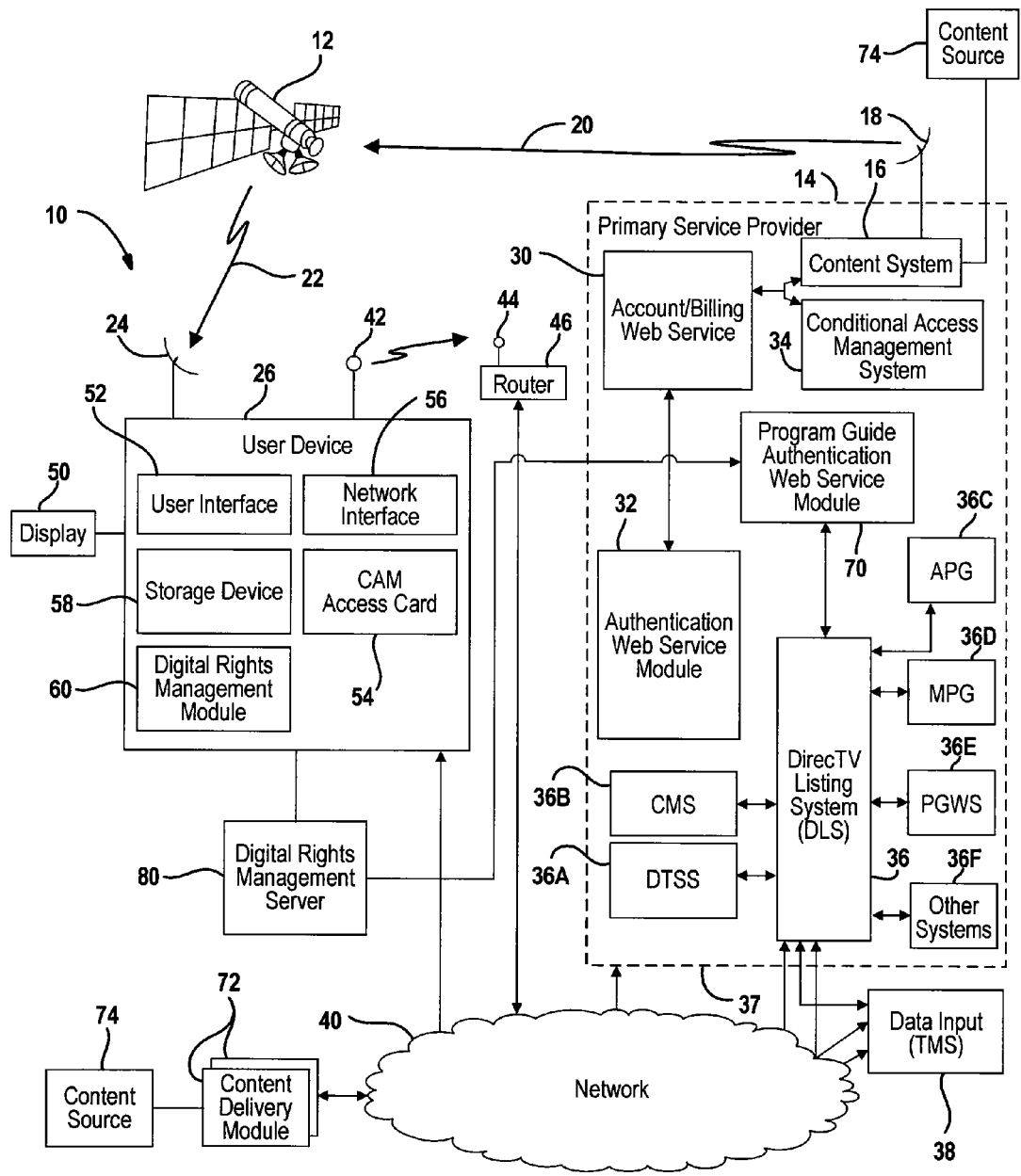
FIG. 1 is a block diagrammatic view of a satellite communication system.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a satellite television broadcast system 10 is illustrated. The satellite television broadcast system 10 is illustrated by way of example. However, the present disclosure is not as limited as mentioned above. The television broadcast system 10 includes a satellite 12 that receives content or programming from a primary service provider 14.

The primary service provider 14 includes a content system 16 that generates uplink signals 20 corresponding to content through an uplink antenna 18. As mentioned above the content may be various types of content including but not limited to live content, recorded content, pay-per-view content and on-demand content. The uplink signals 20 may be television signals and more specifically digital television signals. The uplink signals 20 may also be data including but not limited to interactive television data and program guide data. The uplink antenna 18 communicates the uplink signals 20 to the satellite 12 which in turn generates downlink signals 22. The downlink signals 22 are communicated to a receiving antenna 24 of a user device 26. Although only one user device 26 is illustrated, several user devices may be provided in the system 10. The uplink signals 20 and downlink signals 22 may be referred to as communication signals. Communication signals are wireless communication signals and may include various types of entertainment content, data, traffic, weather, hazardous material warnings, advertising material, guide data and the like. As mentioned above, this system may be suitable for wired systems such as cable televisions and terrestrial wireless systems.

The user device 26 may include a satellite television receiver, set top box or a digital video recorder. The satellite television receiver may also be referred to as an integrated receiver decoder. Of course, other types of user devices may be used such as a cable television set top box. Other types of user devices may also include a mobile device such as a lap top computer, cellular phone, personal digital assistant, a portable media player or an automotive-based television receiving device. Thus, the user device 26 may be a fixed user device in the case of a satellite television set top box or a mobile user device. Both fixed and mobile devices may be used in a system.

The primary service provider 14 may also include an account/billing web service 30 and a first authentication web service module 32. The first authentication web service module 32 may include an authentication server for generating and validating user devices using encrypted tokens (eTokens) or other processes as will be described below. The first authentication web service module 32 may also receive a setup request for a new user device and set up an account for a new user device. Details of this process are provided below.

The primary service provider 14 may also include a conditional access management system 34. The conditional access management system 34 may be used to grant conditional access to various programming as well as provide recording commands to the user device 26 as will be described below.

The primary service provider 14 may also include a DIRECTV® listing system (DLS) 36. The listing system 36 may be in communication with a DIRECTV® traffic and scheduling system (DTSS) 36A. The DTSS 36A may provide program schedule data and channel data for the program content. The program schedule data and channel data may be used as part of the program guide.

The DLS 36 may also be in communication with a content management system (CMS) 36B. The CMS 36B may provide metadata regarding programming content to the DLS 36.

The listing system 36 may also be in communication with an advanced program guide module 36C, a program guide generator 36D, a program guide web service 36E and other systems 36F. The interaction of the DIRECTV® listing system 36 and the various modules 36A-36F will be further described below. In summary, the listing system 36 receives various data from the various systems which may be used to generate program guide data.

An external data input 38, such as Times Media Service® (TMS), may be used for receiving various data regarding programming. Times Media Service® is just one example of an external data service. The external data input 38 may provide channels, programs and schedules as an input to the listing system 36. The external data input 38 may provide various types and formats of data and images such as posters for content and data regarding the program content or actors therein. A data stream may be provided with various types of data regarding programming.

The user device 26 is in communication with the primary service provider 14 through a network 40. The network 40 may be a secured network or use a secure protocol. The network 40 may include a broadband network through which the user device 26 communicates with the primary service provider 14. The network 40 may be a wired network such as a public-switched telephone network (PSTN) or a broadband Internet network. The network may be wireless such as a cellular or wireless Internet system. The broadband network may communicate wired, wirelessly or a combination of both. For example, the user device 26 may include a wireless antenna 42 for communicating with an antenna 44 of a router 46 which, in turn, is in communication with the network 40.

The network 40 may also be an intranet. The components of both the primary and partner service provider may be located separately or in the same building.

The user device 26 may be associated with a display 50 for displaying content and programming, as well as displaying various types of user commands, or the like. The display 50 may be a television or display integrated into the device. The display 50 may include speakers for an audio display. The display 50 may be used for displaying primary content from a primary service provider and secondary content from a secondary service provider.

The user device 26 may include a user interface 52, such as a keyboard, remote control, or the like, for selecting and entering various types of information by the user. The user device 26 may also include a conditional access module 54 that allows the user to access the programming provided from the content system 16. The conditional access module 54 may be referred to as an access card. The program schedule data and channel data may include various activation codes without which the user device is not activated. The conditional access module 54 may include a conditional access module identifier such as a number or a code. As mentioned above, the conditional access module 54 is suitable for fixed user devices and may not be present in mobile user devices.

The user device 26 may also include a network interface 56 for interfacing with the network 40. For example, the network interface 56 may communicate wirelessly through the antenna 42 or through a direct connection such as an Ethernet connection. The network interface 56 may be but is not limited to a wireless broadband interface, a broadband interface, a modem-type interface or a public-switched telephone network interface.

The user device 26 may also include a storage device 58. The storage device 58 may store various content and data received from the primary service provider therein. The content may be received through the satellite 12 or through the network 40 through the network interface 56. The storage device 58 may be a hard disk drive or memory chip-based device. The storage device 58 may be referred to as a digital video recorder, particularly in a fixed user device. The data may include, but is not limited to, a site user identifier, a site identifier and a location of the user device such as a URL.

The user device 26 may also include a digital rights management module 60. The digital rights management module 60 may obtain the digital rights to allow the user device to obtain and play back various types of content such as streaming content and pay-per-view content.

The primary service provider 14 may include a program guide authentication web service module. The program guide authentication web service module 70 may provide an interface for the program guide web service 36E. Prior to providing program guide web service data, the user device may be authenticated at the program guide authentication web service module 70.

The program guide authentication web service module 70 may receive data from the DLS 36. The material ID may be used to provide a streaming program identifier, a TMS identifier or other external identifier may be used to obtain the material identifier used within the primary service provider 14, a linear program identifier may be used to obtain a material identifier used in the primary service provider 14, and a broadband video-on-demand identifier may also be used to obtain the material identifier. The operation of the authentication is described further below.

A content delivery module (or content delivery network) 72 may provide the actual content to the user device 26. The content delivery module 72 may be implemented in a plurality of content delivery modules. The content delivery module 72 may be implemented in a plurality of content delivery modules 72 spaced geographically relative the primary service provider 14. Regional content delivery modules 72 may be used to provide the content directly to the various user devices 26. Because of the various geographic locations, the content delivery module 72 closest to the user device may be used to provide content so that the fastest service may be provided. The content delivery module 72 may receive the content from the primary service provider 14 or directly from another content source 74. The content source 74 may also provide content to the content system 16 within the primary service provider 14.

A digital rights management server 80 is disposed between the user device 26 and the primary service provider 14. The digital rights management server 80 may receive a query signal from the digital rights management module 60 of the user device 26. The digital rights management module 60 may perform a concurrency check on the query signal. The query signal may include an eToken, a URL of the user device signature key, a server time and a content time. Concurrence of the signal is used to determine whether to communicate the query signal to the program guide authentication web service module 70. When the concurrency check for the signal is not passed, the query signal is not provided to the program guide authentication web service module 70. When the concurrency check is passed, the query signal is communicated to the program guide authentication web service module 70. The concurrency check determines whether there is agreement with the contents of the query signal. Different contents of the signal may be used in the concurrency check. A valid eToken may be checked, the URL of the user device signature key may be checked, a content identifier may be checked, and the like. All or some of the above-mentioned data may be checked in the concurrency check.

The digital rights management server 80 may also be used to receive the authorization signal and generate a request for content to the closest content delivery network using the URL and the material ID. In this manner, the digital rights management server 80 provides the content delivery network with the proper data so that the content requested by the user device may then be communicated directly from the content delivery network to the user device. In a sense, the digital rights management server 80 intercedes in the process.

Figure 2:
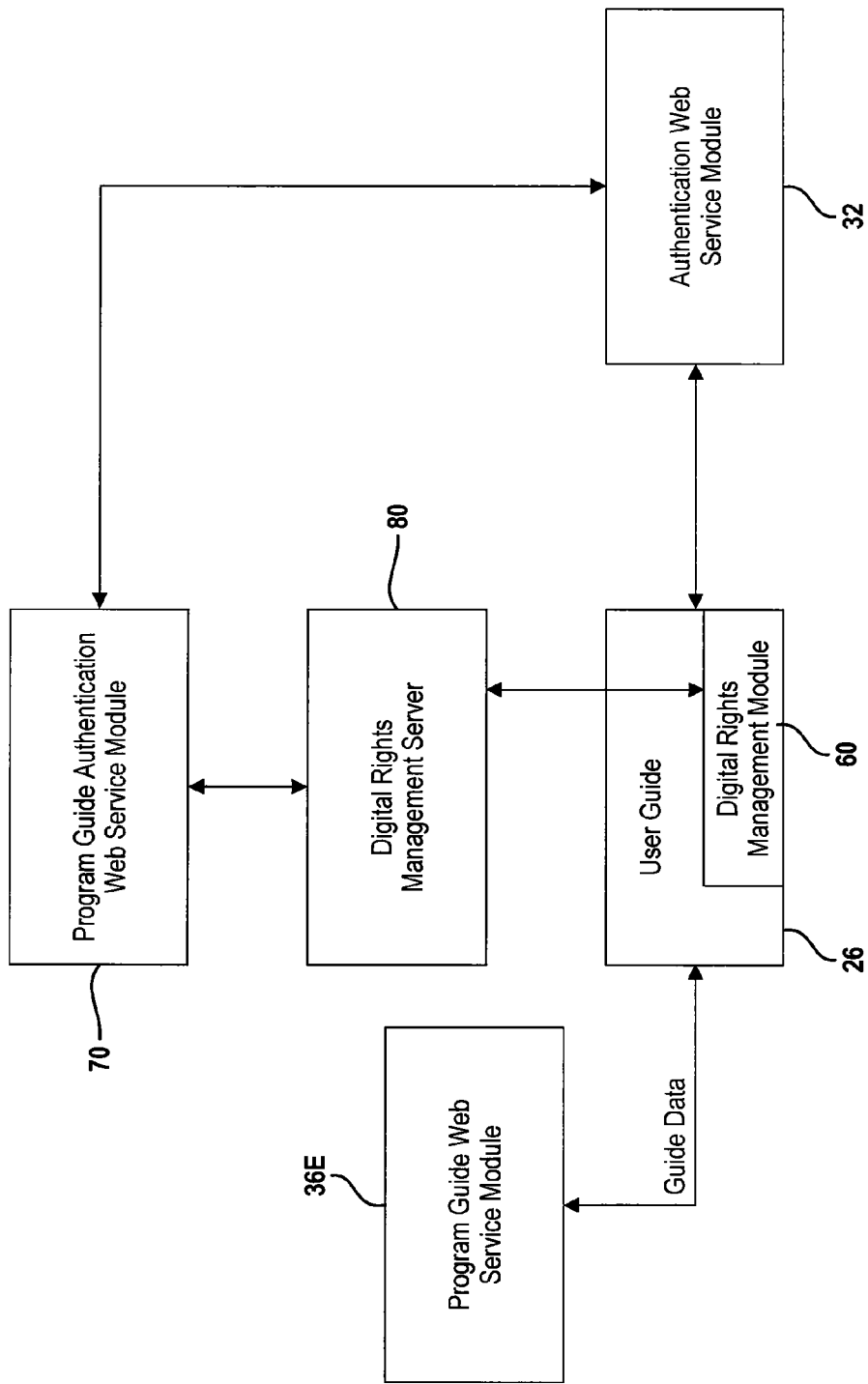
FIG. 2 is a simplified block diagrammatic view of the digital rights management system.

Referring now to FIG. 2, a simplified block diagrammatic view of the components involved in digital rights management is set forth. In this example, the communication between the user device 26 and the digital rights management module 60, the digital rights management server 80, the authentication web service module 32, the program guide authentication web service module 70 and the program guide web service 36E are set forth. Operation of the components is set forth below.

Figure 3B:
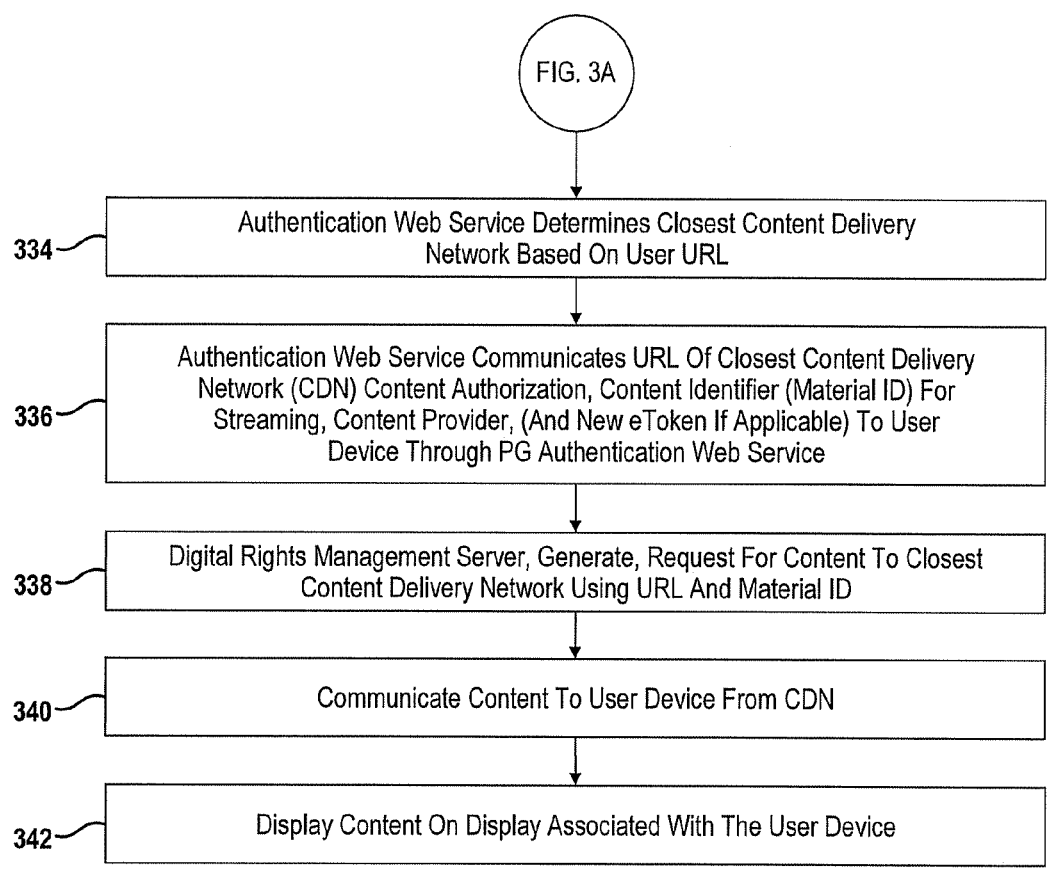

Referring now to FIGS. 2, 3A and 3B, the operation of the digital rights management for content at the user device 26 is set forth. In step 310, an account for the user device 26 is set up at the authentication web service module 32. This may take place directly using the user device 26. The user device 26 is an account-specific user. An account-specific user is a user that has an account with the primary service provider 14. In the present example, a current DIRECTV® subscriber would be classified as an account-specific user. The authentication web service module 32 may authorize the user based on subscribed services or authorized content. That is, program guide data or actual content may be provided to a user so that the data corresponds to the services that the particular user is subscribed to. The account setup may establish a site identifier and site user identifier. The site user identifier may be a unique identifier such as the user's email address; the site identifier may be a unique identifier assigned to each user. Step 310 may thus generate an account setup request signal which is communicated to the authentication web service. The account setup request signal may include various verifying data such as account identifiers, passwords, and the like. The account may also be setup using voice or other personal interaction with a system operator.

In step 312, the authentication web service module 32 may provide authentication data to the user device 26. The data may include a signature key which is based on an authentication server time. The server time may be a current time such as hours, minutes or a representation thereof. The client or user device 26 may be required to be in synch with the server time. The server time may be encrypted to form the signature key. The signature key may thus be the encrypted server time in coordinated universal time (UTC).

Other data provided from the authentication web service module 32 may include an encrypted token (eToken) and a reference identifier. The encrypted token may be an encrypted random or pseudo-random number. The reference identifier may be a unique identifier associated with a particular user account. An encrypted user account number or other type of unique identifier for the account may be used as the reference identifier. In step 314, a request for guide data from the program guide web service module 36E is generated at the user device 26. The guide data may correspond to the services subscribed to by the user device 26 may be communicated to and received by the user device 26 in step 316. Of course, data for services unavailable may be provided to entice the customer to upgrade.

In step 318 content identifiers such as a content title is selected in step 318. The selection may be made using a user interface interacting with a display of the user device. A selection signal may thus be generated. At the same time, the digital rights management module 60 within the user device 26 may generate a digital rights determination signal which may be referred to as a query signal. The digital rights determination signal is communicated from the user device 26 to the program guide authentication web service module 70 through the digital rights management server 80 to determine whether the user device 26 has been authorized for the particular type of content selected such as streaming content. In step 322, the digital rights management server 80 performs a concurrency check as mentioned above. The concurrency check is performed on the digital rights determination signal. The concurrency check may be performed on various portions or all of the data in the digital rights determination signal such as the eToken, the URL of the user device signature key, the server time and the content identifier. When the query or digital rights determination signal passes a concurrency check, step 324 is performed as described below. The digital rights determination signal of step 320 may include or is communicated with an electronic token that was retrieved from the authentication web service module 32 during account setup. The location or address of the user device may also be provided as a site identifier or site user identifier. The location may also be provided in or determined from a uniform resource locator (URL) from which the user communicated the digital rights determination signal. The signature key, the server time and a content identifier corresponding to the selected content title may be provided to the program guide authentication web service module in step 320.

In step 324, the program guide authorization web service module 70 communicates a query signal to the PG authorization web service module 32 together with one or more of the eToken, the user location, the site identifier, a site user identifier, the reference identifier, and the signature key to see if the user account is in good standing. The PG authentication web service module 32 determines whether the user device 26 is authorized for the particular subscription service. One or more of the above electronic token, signature key, reference identifier, site user identifier, and user location may be used. It should be noted that the site identifier and site user identifier may be a unique identifier assigned to each user device by the authentication web service module 32. A unique user identifier such as a site user identifier may also be provided. In some cases, the site user identifier may be the email address associated with the particular account.

In step 326, the PG authentication communicates to the account web service using the account identifier to get account subscription services and pay-per-view event codes. In step 328, the PG authorization web service sets a streaming flag.

Step 330 determines whether the user is authorized by checking in the streaming flag. Step 330 may be performed at the authentication web service module 32. If the user is not authorized in step 330, step 332 stops the process and the content is not provided to or use-enabled at the user device. A failure signal may also be transmitted to the user device to indicate the lack of authorization. The failure signal may be displayed on the display. In step 324, if the user is authorized in step 330, the PG authorization web service, in step 334, determines the closest content delivery network based upon the user device location (from a uniform research locator or site user identifier). Step 334 may also generate a new encrypted token with a time stamp. Step 334 may also return a subscription service code or pay-per-view event code for authorizing the particular content. In step 336, the PG authorization web service module 32 communicates the URL of the closest content delivery module or network to the user device 26 through the program guide authentication web service module 70. If a new electronic token (eToken) is generated in step 334, the new eToken is also communicated to the user device. The authentication web service may also communicate a content authorization, a content identifier such as a material identifier for streaming, and a content provider to the user device to perform streaming. This may be performed through the digital rights management server 80.

In step 338, the digital rights management server 80 may generate a request for content that is communicated to the closest content delivery network using the location or URL of the closest content delivery network and a material identifier associated with the content selected. In step 340, the content is communicated from the content delivery network to the user device. The content is displayed on a display associated with the user device in step 342.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:
1. A method comprising:
receiving guide data at a user device;
displaying the guide data on a display associated with the user device;
selecting content from the guide data and forming a selection signal for the content;

communicating a digital rights determination signal to a first authentication module in response to selecting;

performing a concurrency check on the digital rights determination signal;

in response to performing the concurrency check, communicating a query signal from the first authentication module to a second authentication module to determine whether the user device is authorized to receive content associated with the selection signal;

when the user device is authorized, communicating an address of a content delivery module for the content from the second authentication module to a digital rights management server through the first authentication module; and communicating a request for the content to a content delivery module using the address of the content delivery module;

communicating the content to the user device; and displaying content on the display associated with the user device.

2. The method as recited in claim 1 wherein prior to receiving guide data at a receiving device, forming an account at a primary service provider associated with the second authentication module by storing account data in a memory of the primary service provider.

3. The method as recited in claim 2 wherein forming the account comprises communicating an electronic token to the user device and wherein the digital rights determination signal comprises the electronic token.

4. The method as recited in claim 3 wherein communicating the digital rights determination signal comprises communicating the digital rights determination signal with the electronic token and wherein communicating the query signal comprises communicating the query signal with the electronic token.

5. The method as recited in claim 2 wherein forming the account comprises communicating a signature key formed using a time at the first authentication module to the user device and wherein the digital rights determination signal comprises the signature key.

6. The method as recited in claim 5 wherein communicating the digital rights determination signal comprises communicating the digital rights determination signal with the signature key and wherein communicating the query signal comprises communicating the query signal with the signature key.

7. The method as recited in claim 2 wherein forming the account comprises communicating a reference identifier based on an account number at the first authentication module to the user device and wherein the digital rights determination signal comprises the reference identifier.

8. The method as recited in claim 7 wherein communicating the digital rights determination signal comprises communicating the digital rights determination signal with the reference identifier and wherein communicating the query signal comprises communicating the query signal with the reference identifier.

9. The method as recited in claim 2 wherein forming the account comprises communicating an electronic token, signature key and a reference identifier to the user device and wherein the digital rights determination signal comprises the electronic token, the signature key and the reference identifier.

10. The method as recited in claim 9 wherein communicating the digital rights determination signal comprises communicating the digital rights determination signal with the electronic token, the signature key and the reference identifier and wherein communicating the query signal comprises communicating the query signal with the electronic token, the signature key and the reference identifier.

11. The method as recited in claim 1 wherein communicating a digital rights determination signal comprises communicating a digital rights determination signal and a user site identifier corresponding to a location of the user device and further comprising determining the address of the content delivery module in response to user site identifier.

12. The method as recited in claim 1 wherein communicating the digital rights determination signal comprises communicating the digital rights determination signal from a digital rights management module of the user device.

13. The method as recited in claim 1 wherein receiving guide data at the user device comprises receiving guide data at a mobile user device.

14. A system comprising:

a user device receiving guide data and displaying the guide data on a display associated therewith, said user device forming a selection signal for content from the guide data;

a first authentication module in communication with the user device;

the user device comprising digital rights management module that communicates a digital rights determination signal to the first authentication module;

the first authentication module performing a concurrency check on the digital rights determination signal and in response to performing the concurrency check, communicating a query signal to a second authentication module to determine whether the user device is authorized to receive the content associated with the selection signal;

the second authentication module communicating an address for the content of a content delivery module to a digital rights management module through the first authentication module when the user device is authorized;

a digital rights management server communicating a request for the content to a content delivery module using the address of the content delivery module;

the content delivery module communicating the content to the user device; and the user device displaying the content at the user device.

15. The system as recited in claim 14 wherein a primary service provider associated with the second authentication module forms an account prior to receiving guide data at a receiving device by storing account data in a memory of a primary service provider.

16. The system as recited in claim 14 wherein the second authentication module communicates an electronic token to the user device and wherein the digital rights determination signal is communicated with the electronic token.

17. The system as recited in claim 16 wherein the user device communicates the digital rights determination signal with the electronic token and wherein the first authentication module communicates the query signal with the electronic token.

18. The system as recited in claim 14 wherein the second authentication module communicates a signature key formed using a time at the first authentication module to the user device and wherein the digital rights determination signal is communicated with the signature key.

19. The system as recited in claim 18 wherein the user device communicates the digital rights determination signal with the signature key and wherein the first authentication module communicates the query signal with the signature key.

20. The system as recited in claim 14 wherein the second authentication module communicates a reference identifier based on an account number at the first authentication module to the user device and wherein the digital rights determination signal is communicated with the reference identifier.

21. The system as recited in claim 20 wherein the user device communicates the digital rights determination signal with the reference identifier and wherein the first authentication module communicates the query signal with the reference identifier.

22. The system as recited in claim 14 wherein a primary service provider forms an account and generates an electronic token, signature key and a reference identifier, said primary service provider communicates the electronic token, signature key and the reference identifier to the user device and wherein the digital rights determination signal is communicated with the electronic token, the signature key and the reference identifier.

23. The system as recited in claim 22 wherein the user device communicates the digital rights determination signal with the electronic token, the signature key and the reference identifier and wherein the first authentication module communicating the query signal with the electronic token, the signature key and the reference identifier.

24. The system as recited in claim 14 wherein the user device communicates the digital rights determination signal with a user site identifier corresponding to a location of the user device and the second authentication module determines the address of the content delivery module in response to user site identifier.

25. The system as recited in claim 14 wherein a digital rights determination module communicates the digital rights determination signal to the first authentication module.

26. The system as recited in claim 14 wherein the user device comprises a mobile user device.

27. A method comprising:
communicating an encrypted token and a reference identifier corresponding to an account from a first authentication module to a user device;
receiving guide data at a user device;
displaying the guide data on a display associated with the user device;
selecting content from the guide data and forming a selection signal;
communicating a digital rights determination signal with the encrypted token, reference identifier and a user location to a second authentication module in response to selecting;
performing a concurrency check on the digital rights determination signal;
in response to performing the concurrency check, communicating a query signal with the encrypted token, the reference identifier and the user location from the second authentication module to the first authentication module to determine whether the user device is authorized to receive content associated with the selection signal;
when the user device is authorized, determining an address of a content delivery module in response to the user location;
communicating the address of the content delivery module from the first authentication module to a digital rights management module through the second authentication module;
communicating a request for content to the content delivery module using the address of the content delivery module;
communicating content to the user device corresponding to the selection signal; and
displaying content on the display associated with the user device.

28. A method as recited in claim 27 wherein the user location comprises a uniform resource locator.

* * * * *